US012391056B2

(12) United States Patent
Abe et al.

(10) Patent No.: US 12,391,056 B2
(45) Date of Patent: Aug. 19, 2025

(54) IMAGE RECORDING APPARATUS

(71) Applicant: CANON KABUSHIKI KAISHA, Tokyo (JP)

(72) Inventors: Takashi Abe, Kanagawa (JP); Yasuyuki Takanaka, Kanagawa (JP); Norio Sakurai, Tokyo (JP); Atsushi Kohnotoh, Tokyo (JP); Taiji Maruyama, Kanagawa (JP); Yusuke Naratani, Tokyo (JP); Shuhei Yamaguchi, Kanagawa (JP); Kousuke Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 18/338,968

(22) Filed: Jun. 21, 2023

(65) Prior Publication Data

US 2023/0415504 A1 Dec. 28, 2023

(30) Foreign Application Priority Data

Jun. 27, 2022 (JP) ................................. 2022-102964

(51) Int. Cl.
*B41J 25/00* (2006.01)
*B41J 19/00* (2006.01)

(52) U.S. Cl.
CPC ........... *B41J 25/006* (2013.01); *B41J 19/005* (2013.01)

(58) Field of Classification Search
CPC .............................. B41J 25/006; B41J 19/005
See application file for complete search history.

(56) References Cited

U.S. PATENT DOCUMENTS

2007/0155561 A1* 7/2007 Sugiura .................. B41J 19/005 474/144

FOREIGN PATENT DOCUMENTS

| | | | | | |
|---|---|---|---|---|---|
| EP | 3276934 | A1 | * | 1/2018 | ......... H04N 1/00525 |
| JP | 1076731 | A | | 3/1998 | |
| JP | 2001158145 | A | * | 6/2001 | .............. B41J 19/20 |
| JP | 2006021423 | A | * | 1/2006 | .............. B41J 19/20 |
| JP | 2006198936 | A | | 8/2006 | |

* cited by examiner

*Primary Examiner* — Yaovi M Ameh
(74) *Attorney, Agent, or Firm* — Venable LLP

(57) ABSTRACT

An image recording apparatus includes a belt passed around a drive pulley and a driven pulley, a support member configured to support a recording head and fixed to the belt, a holder member, having a claw part, configured to hold the driven pulley, and a frame having a first opening for the claw part to penetrate. The holder member is attached to the frame such as to be movable relative to the drive pulley. The first opening has an enlarged opening portion allowing the claw part to pass through without engaging with the frame on one side closer to the drive pulley. At least a portion of the claw part is positioned within a part of the first opening excluding the enlarged opening portion in a state where the holder member is positioned in a predetermined location closer to the drive pulley.

10 Claims, 9 Drawing Sheets

IMAGE RECORDING APPARATUS

BACKGROUND OF THE INVENTION

Field of the Invention

The present invention relates to an image recording apparatus.

Description of the Related Art

A serial-type image recording apparatus performs recording by ejecting ink from a recording head mounted on a carriage onto a recording medium as the carriage is reciprocated in a direction intersecting with the transport direction of the recording medium. A belt-driven system is known as a mechanism for moving the carriage, which uses an endless belt passed around a motor-driven drive pulley and a driven pulley. In the belt-driven system, a holder member that holds the driven pulley is attached to a frame such as to be movable relative to the drive pulley. The tension of the belt is stabilized by a biasing member that is provided to apply a force for moving the holder member away from the drive pulley. A claw part of the holder member engages with the frame via an opening that extends along the direction of the movement of the holder member to prevent detachment of the holder member from the frame while allowing relative movement thereof. One structure for attaching the holder member to the frame features an enlarged opening portion provided at one end of the opening closest to the drive pulley and sized to allow passage of the claw part. In this configuration, the holder member is attached to the frame as follows: The claw part is first passed through the enlarged opening portion, after which the holder member is moved away from the drive pulley. With the claw part engaging with the opening, the biasing member is connected to the holder member, and the belt is passed around the drive pulley and driven pulley.

An extensive force applied to the holder member by the biasing member generates a large tension in the belt. As a result, more energy will be required for driving the carriage, which may necessitate a larger motor or lead to increased power consumption or reduced durability. On the other hand, if the force applied to the holder member by the biasing member is insufficient, sudden increases in the belt drive force, such as those caused by carriage acceleration, may cause the holder member to jerk towards the drive pulley. If the holder member is attached to the frame with the mounting structure described above, the claw part may pass through the enlarged opening portion and disengage from the frame when the holder member reaches its movement limit on the side closer to the drive pulley, in which case the holder member may detach from the frame.

Japanese Patent Application Publication No. 2006-198936 describes a technique for restricting the movement of a driven pulley towards a drive pulley. This is achieved by providing a component that limits the movement of a holder member of the driven pulley. Japanese Patent Application Publication No. 2006-21423 describes a technique for limiting the movement of a holder member of a driven pulley by a frictional force generated by applying pressure to the holder member towards a frame.

SUMMARY OF THE INVENTION

The configuration described in Japanese Patent Application Publication No. 2006-198936 requires additional components and increases costs. With the configuration described in Japanese Patent Application Publication No. 2006-21423, if the frictional force is not strong enough to handle a sudden increase in belt drive force, it may be difficult to control the movement of the holder member.

An object of the present invention is to prevent detachment of a holder member that holds a driven pulley from a frame in an image recording apparatus where a recording head is driven by a belt and where the holder member is attached to the frame such as to be movable relative to a drive pulley.

The present invention is an image recording apparatus comprising:

a belt passed around a drive pulley and a driven pulley;

a support member configured to support a recording head and fixed to the belt;

a holder member, having a claw part, configured to hold the driven pulley; and a frame having a first opening through which the claw part is capable of penetrating, and to which the holder member is attached such as to be movable relative to the drive pulley, wherein the first opening having an enlarged opening portion allowing the claw part to pass through without engaging with the frame on one side closer to the drive pulley, and in a state where the holder member is positioned in a predetermined location closer to the drive pulley, at least a portion of the claw part is within a part of the first opening excluding the enlarged opening portion.

Further features of the present invention will become apparent from the following description of exemplary embodiments with reference to the attached drawings.

DESCRIPTION OF THE EMBODIMENTS

Embodiment 1

Embodiments of the present invention will be hereinafter illustrated with reference to the drawings. It should be noted that the sizes, materials, shapes, and relative arrangement or the like of constituent components described in the embodiments should be altered suitably in accordance with the configuration and various conditions of an apparatus to which the invention is applied, and it is not intended to limit the scope of this invention to the following embodiments.

Inkjet Recording Apparatus

Figure 1:
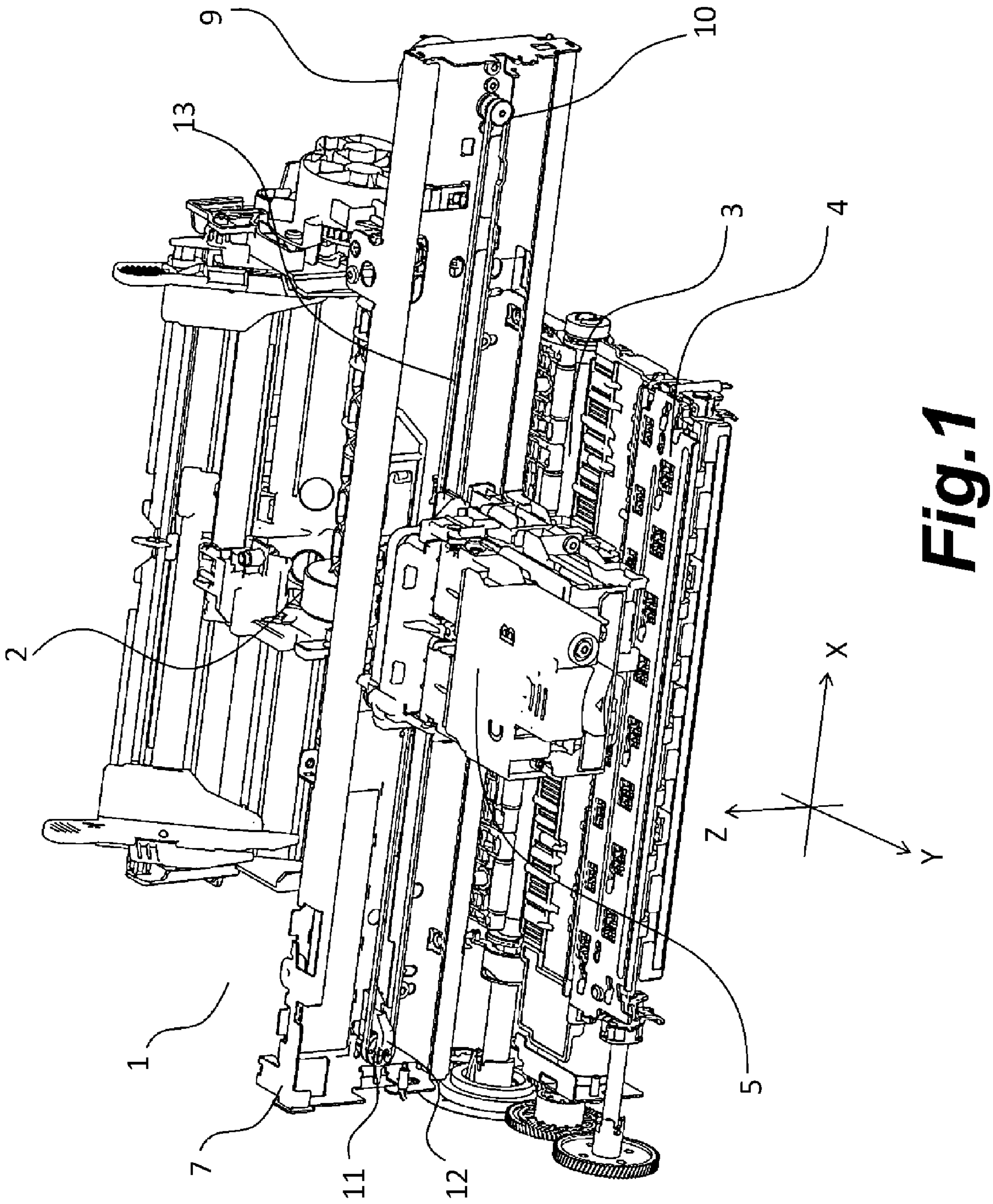
FIG. 1 is a diagram illustrating the interior of an inkjet recording apparatus according to Embodiment 1.

FIG. 1 is a perspective view illustrating the interior of an inkjet recording apparatus 1 (hereinafter referred to as recording apparatus) as one example of an image recording apparatus according to Embodiment 1 of the present invention. The recording apparatus 1 includes a feed part 2, a transport part 3, a discharge part 4, a carriage 5, and a frame 7 that guides the carriage 5. The carriage 5 has a recording head 6 at a position opposite the transport part 3 (see FIG. 3A and FIG. 3B). Recording media (not shown) are stacked in the feed part 2. The recording medium is transported to a position opposite the recording head 6 via the transport part 3. The recording head 6 ejects ink as the carriage 5, which is a support member that supports the recording head 6, is reciprocated in a direction (main scanning direction or X direction) intersecting with the transport direction of the recording medium (sub scanning direction or Y direction) along the frame 7 to record an image on the recording medium. The recording medium on which an image was recorded is discharged to the outside of the recording apparatus 1 via the discharge part 4. A toothed drive pulley 10 is installed at the end in the positive X direction of the frame 7, and a drive member 9 such as a motor is connected to the drive pulley 10 to rotate the drive pulley 10. A holder member 12 that holds a driven pulley 11 in a rotatable manner is mounted at the end in the negative X direction of the frame 7. An endless toothed belt 13 is passed around the drive pulley 10 and driven pulley 11, with the teeth of the drive pulley 10 engaging with the teeth of the belt 13. The carriage 5 is secured to the belt 13, and therefore the recording head 6 is fixed to the belt 13. As the drive pulley 10 is rotated by the drive member 9, the carriage 5 is pulled by the belt 13 and reciprocates in the X direction along the frame 7.

Holder Member

Figure 2C:
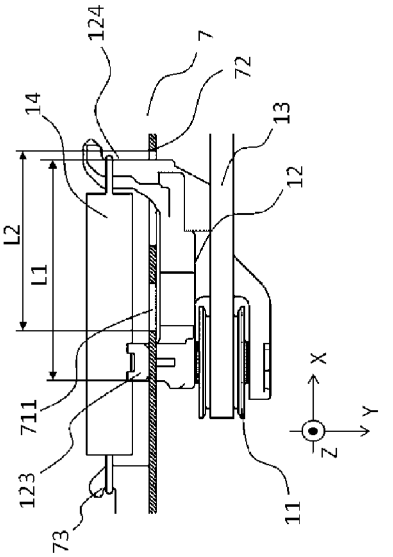
FIG. 2A to FIG. 2D are diagrams illustrating the configuration of a holder member according to Embodiment 1.
Figure 2D:
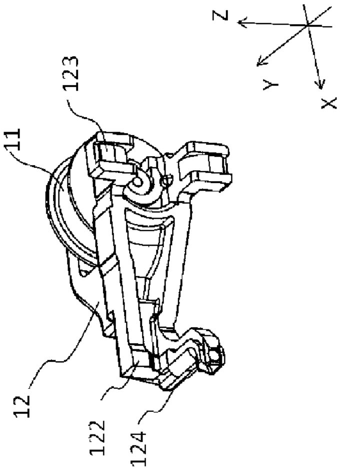
Figure 2A:
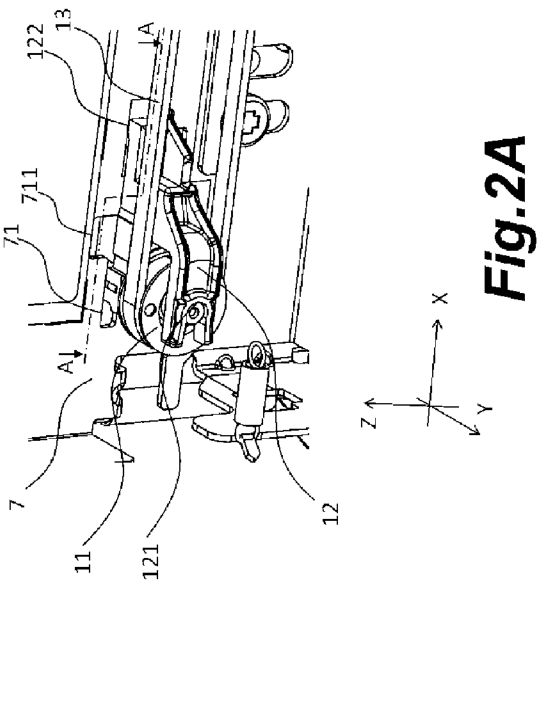
Figure 2B:
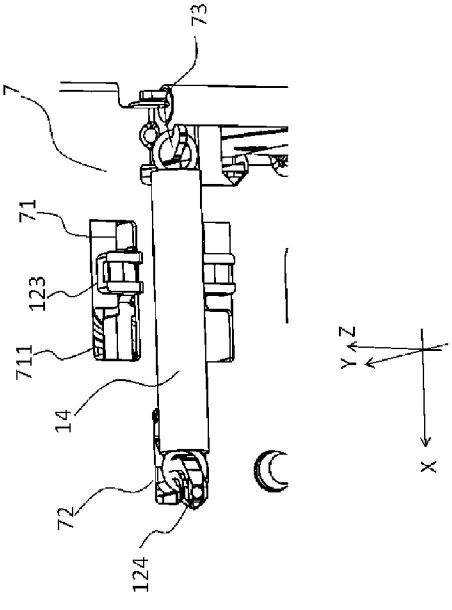

FIG. 2A to FIG. 2D are diagrams illustrating the configuration of the holder member 12 according to Embodiment 1. FIG. 2A is a diagram of the frame 7 as viewed from the side on which the holder member 12 is set (positive Y side, hereinafter referred to as the front side). FIG. 2B is a diagram of the frame 7 as viewed from the opposite side from the front side (negative Y side, hereinafter referred to as the back side). FIG. 2C is a cross-sectional view taken along A-A in FIG. 2A. FIG. 2D is a diagram of the holder member 12 as viewed from the back side.

The frame 7 supports the holder member 12 in a manner that allows the holder member 12 to move in the X direction relative to the frame 7. Since the drive pulley 10 is installed on the frame 7 in Embodiment 1, the holder member 12 is supported by the frame 7 such as to be movable in the X direction relative to the drive pulley 10. The frame 7 has a mounting portion 73 for mounting a biasing member 14 on the back side.

The frame 7 has a first opening 71 that opens from the front side on which the holder member 12 is supported through to the back side, and that extends in the direction of relative movement of the holder member 12 (i.e., the X direction). The first opening 71 includes an enlarged opening portion 711 at one end closest to the drive pulley 10. The enlarged opening portion 711 is larger than the first opening 71 in the direction (i.e., the Z direction) intersecting with the direction in which the first opening 71 extends (i.e., the X direction), and is larger than a claw part 123 to be described later of the holder member 12. Therefore, the claw part 123 of the holder member 12 can pass through the enlarged opening portion 711 without engaging with the frame 7. As will be described later, the enlarged opening portion 711 allows the claw part 123 to penetrate (extend through) the frame 7 when assembling the holder member 12 to the frame 7. The frame 7 also has a second opening 72 that extends in the direction of relative movement of the holder member 12 (i.e., the X direction) and opens from the front side through to the back side. The second opening 72 is provided closer to the drive pulley 10 than the first opening 71.

The holder member 12 includes a bearing part 121, a front side abutment part 122, the claw part 123, and an operating part 124. The bearing part 121 rotatably holds the driven pulley 11. The front side abutment part 122 makes contact with the frame 7 from the front side. The claw part 123 penetrates the first opening 71 and engages with the frame 7 by making contact with the frame 7 from the back side of the frame 7. The operating part 124 penetrates the second opening 72. The biasing member 14 is attached to the operating part on the back side of the frame 7 so that the force applied by the biasing member 14 acts on the operating part.

The biasing member 14 is attached to the mounting portion 73 and the operating part 124. The biasing member 14 applies a force to cause the holder member 12 to move (in the negative X direction) away from the drive pulley 10. While the biasing member 14 in Embodiment 1 is a tension spring, any other means other than tension springs may be used as long as a force can be applied to cause the holder member 12 to move away from the drive pulley 10, such as compression springs, torsion coil springs, and other similar elastic members. The biasing member 14 need not necessarily be provided on the back side of the frame 7 as in Embodiment 1 and may be provided on the front side of the frame 7. The biasing member 14 can apply a force to maintain tension in the belt 13.

A high tension in the belt 13 causes the holder member 12 to move (in the positive X direction) closer to the drive pulley 10, increasing the biasing force received from the biasing member 14. A low tension in the belt 13 causes the holder member 12 to move (in the negative X direction) away from the drive pulley 10, decreasing the biasing force received from the biasing member 14.

Figure 3A:
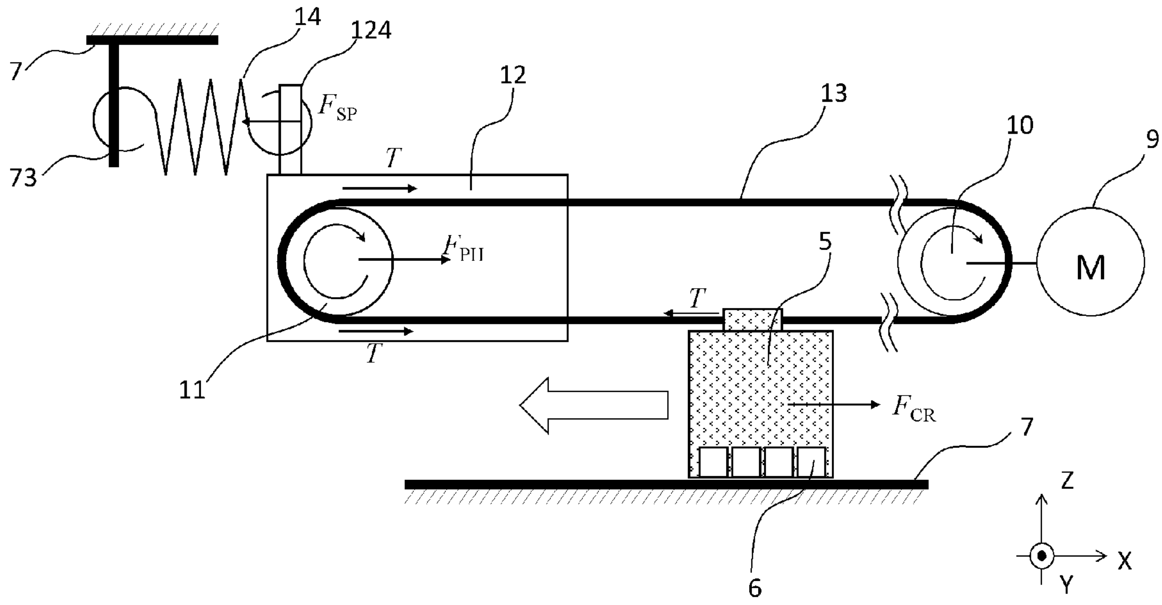
FIG. 3A and FIG. 3B are diagrams explaining the behavior of the holder member according to Embodiment 1.
Figure 3B:
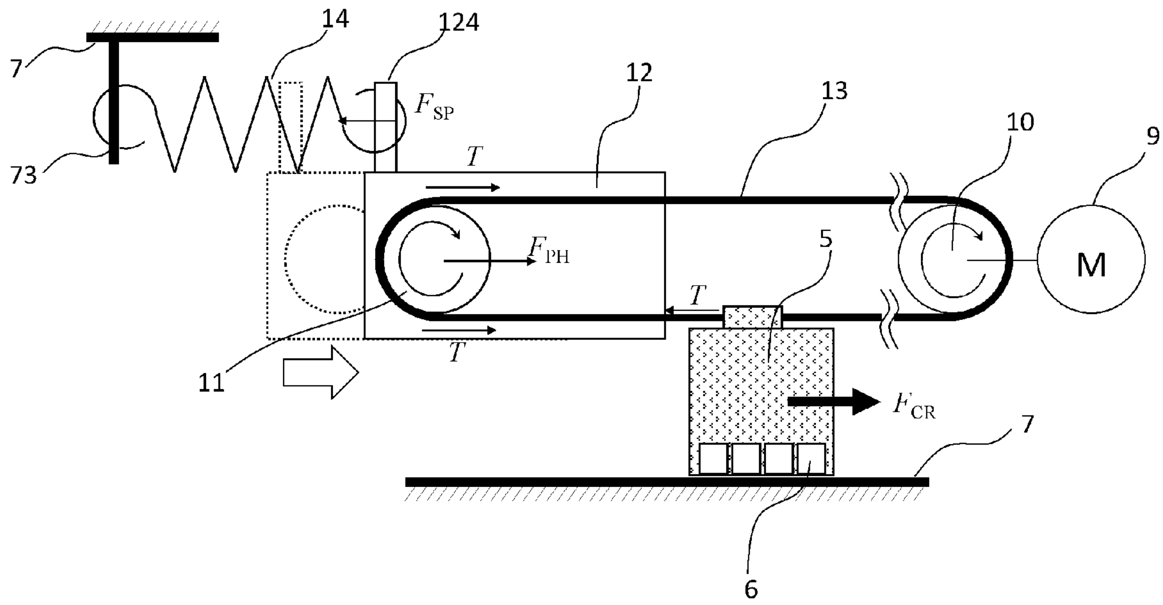

The operation of the holder member 12 is described below with reference to FIG. 3A and FIG. 3B. FIG. 3A is a schematic diagram illustrating the relationship of the forces on the holder member 12 when the carriage 5 moves in the negative X direction (away from the drive pulley 10). The force $F_{CR}$ required for moving the carriage 5 is the sum of resistance forces such as the friction between the carriage 5 and the frame 7 that guides the carriage 5 and air resistance, and inertia (acceleration). The pulling force is provided by the tension T of the belt 13 (therefore $F_{CR}=T$). The force applied to the holder member 12 by the belt 13 is the sum of the tension T of the belt 13 from the driven pulley 11 to the joint between the carriage 5 and the belt, and the tension T of the belt 13 from the driven pulley 11 to the drive pulley 10. Therefore, the force applied to the holder member 12 by the belt 13 is $F_{PH}=2T$. The position of the holder member 12 in the X direction is defined by the balance between this force and the force $F_{SP}$ the holder member 12 receives from the biasing member 14. For example, an increase in resistance force such as when the carriage 5 collides against something, or an increase in inertia by rapid acceleration increases $F_{CR}$, which increases $F_{PH}$, so that the holder member 12 moves in the positive X direction as shown in FIG. 3B. This increases the force $F_{SP}$ of the biasing member 14, which is an elastic member, so that the holder member 12 moves as far as to a position where the increased $F_{SP}$ balances the increased $F_{PH}$.

Comparative Example

Figure 4A:
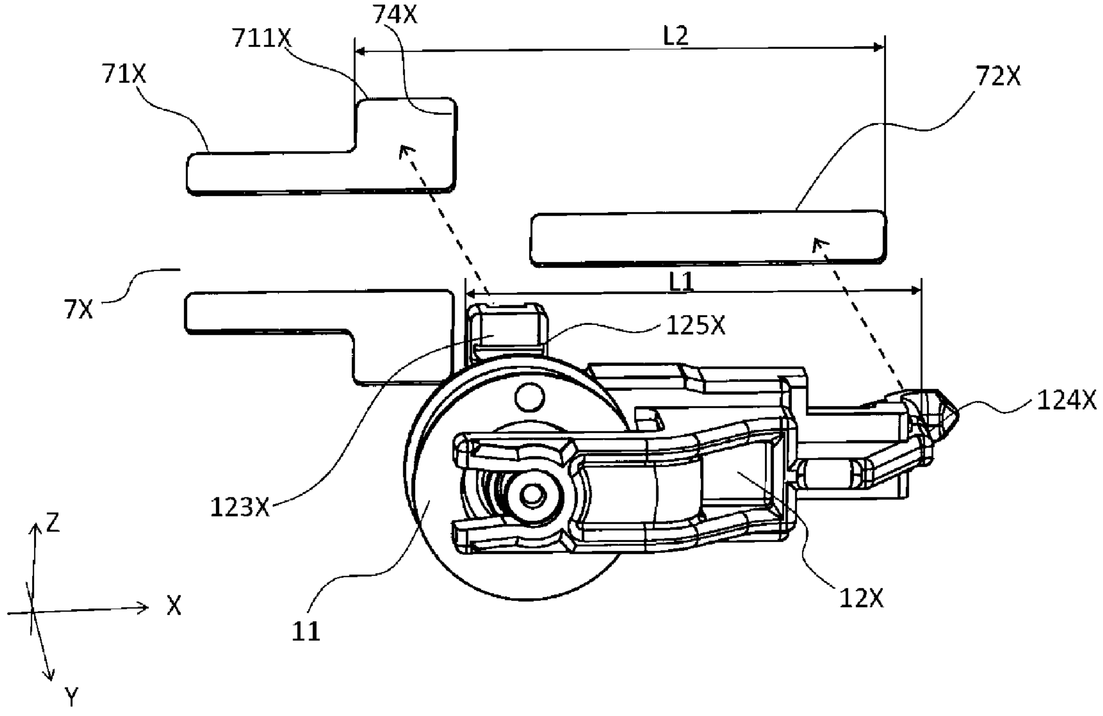
FIG. 4A and FIG. 4B are diagrams illustrating the configuration of a holder member according to a comparative example.
Figure 4B:
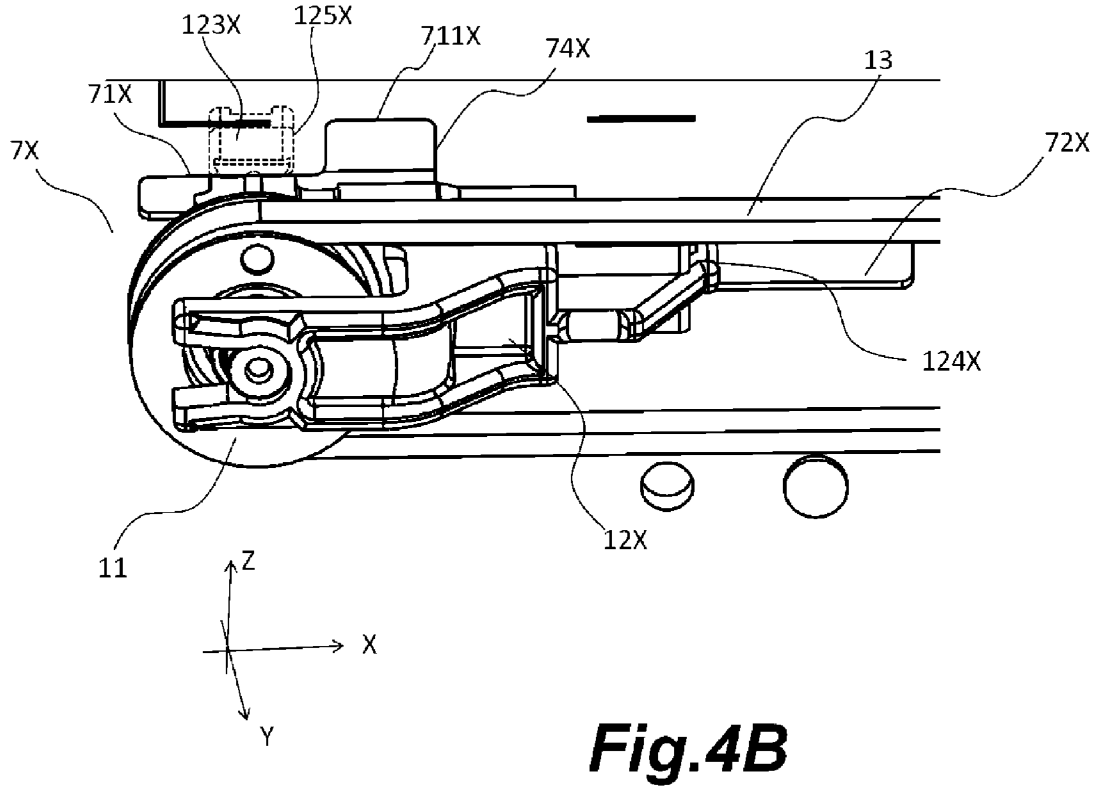
Figure 5A:
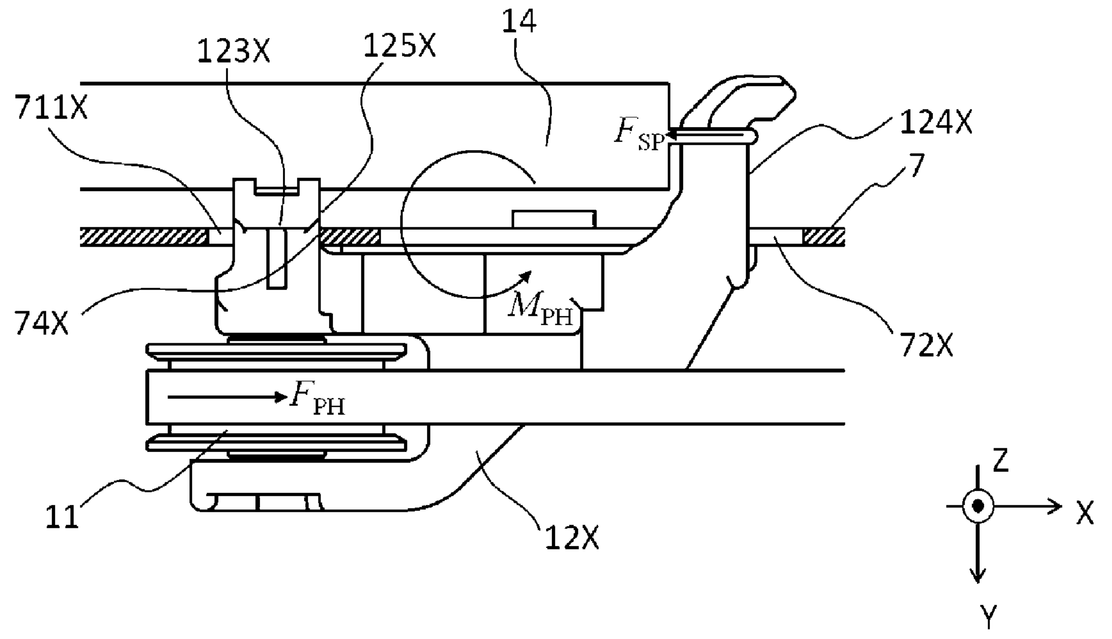
FIG. 5A and FIG. 5B are diagrams explaining the behavior of the holder member according to the comparative example when the holder member is positioned in a predetermined location closer to a drive pulley.
Figure 5B:
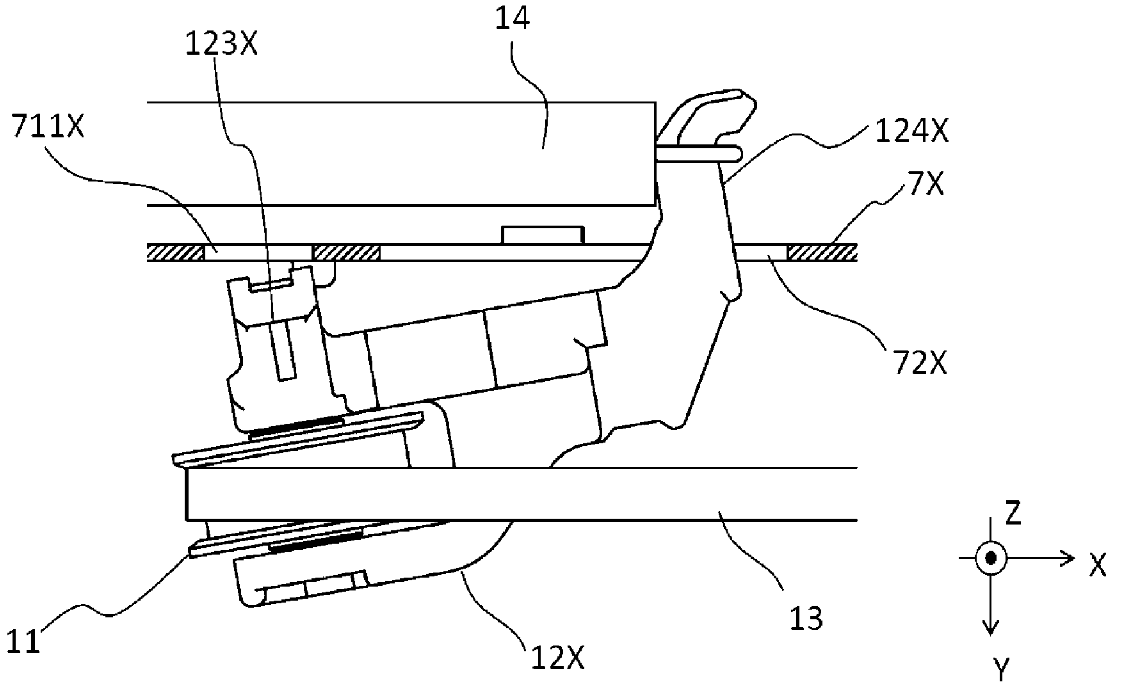

A comparative example for comparison with Embodiment 1 is described below with reference to FIG. 4A and FIG. 4B and FIG. 5A and FIG. 5B. FIG. 4A and FIG. 4B are diagrams illustrating the configuration of the holder member 12X according to the comparative example. FIG. 4A is a diagram illustrating an assembling process of the holder member 12X according to the comparative example. FIG. 4B is a diagram illustrating the holder member 12X according to the comparative example attached to the frame 7X. FIG. 5A and FIG. 5B are diagrams explaining the behavior of the holder member 12X according to the comparative example when the holder member is positioned in a predetermined location closer to the drive pulley 10.

L1 denotes the distance along the direction of relative movement (i.e., the X direction) between the end (i.e., the end in the negative X direction) of the claw part 123X farthest away from the drive pulley 10 and the end (i.e., the end in the positive X direction) of the operating part 124X penetrating the frame 7X and closest to the drive pulley 10. L2 denotes the distance along the direction of relative movement (i.e., the X direction) between the end (i.e., the end in the negative X direction) of the enlarged opening portion 711X farthest away from the drive pulley 10 and the end (i.e., the end in the positive X direction) of the second opening 72X closest to the drive pulley 10. In the configuration of the comparative example, L1<L2.

When attaching the holder member 12X to the frame 7X, the claw part 123X and operating part 124X can be passed respectively through the first opening 71X and second opening 72X of the frame 7X at the same time. Namely, the holder member 12X can be attached to the frame 7X, with the back side of the holder member 12X being kept parallel to the front side of the frame 7X, by bringing the holder member closer to the frame 7X in the direction perpendicular to the front side of the frame 7X (i.e., the negative Y direction). After the claw part 123X of the holder member 12X is passed through the enlarged opening portion 711, the holder member 12X is moved (in the negative X direction) away from the drive pulley 10 so that the claw part 123X engages with the frame 7X via the first opening 71X. In this state, the biasing member 14 is connected to the operating part 124X, and the belt 13 is passed around the drive pulley 10 and driven pulley 11. The holder member 12X is thus attached to the frame 7X.

FIG. 4B shows the state with the belt 13 and biasing member 14 mounted after the holder member 12X has been attached to the frame 7X. The movement of the holder member 12X (in the positive X direction) towards the drive pulley 10 is restricted by the end 125X (i.e., the end in the positive X direction) of the claw part 123 closest to the drive pulley 10 making contact with the end 74X (i.e., the end in the positive X direction) of the first opening 71X closest to the drive pulley 10. In the configuration of FIG. 4A and FIG. 4B, the end (i.e., the end in the positive X direction) 74X of the first opening 71X of the frame 7X closest to the drive pulley 10 serves as a restricting part that restricts the movement of the holder member 12X towards the drive pulley 10 by making contact with the holder member 12X. Therefore, the end 74X shall be hereinafter also referred to as the restricting part 74X. The end (i.e., the end in the positive X direction) 125X of the claw part 123X of the holder member 12X closest to the drive pulley 10 serves as a restricted part capable of making contact with the restricting part. Therefore, the end 125X shall be hereinafter also referred to as the restricted part 125X.

When the restricting part 74X of the frame 7X makes contact with the restricted part 125X of the holder member 12X, the holder member 12X is positioned in a predetermined location closer to the drive pulley 10 (in the positive X direction). That is, the holder member 12X is able to move (in the positive X direction) towards the drive pulley 10 until the restricting part 74X of the frame 7X makes contact with the restricted part 125X of the holder member 12X. Namely, the predetermined location is the movement limit of the holder member 12X on the side closer to the drive pulley 10. The holder member 12X moves in the X direction as far as to a position where the force $F_{PH}$ provided by the tension of the belt 13 balances the force $F_{SP}$ received from the biasing member 14.

Let us now assume that, in the comparative example, the force $F_{CR}$ required for the drive of the carriage 5 has increased and the holder member 12X has reached the predetermined location closer to the drive pulley 10 (in the positive X direction). Since L1<L2, the entire claw part 123X is positioned at the enlarged opening portion 711X, as shown in FIG. 5A.

The force $F_{PH}$ the holder member 12X receives from the belt 13 and the force $F_{SP}$ the holder member 12X receives from the biasing member 14 are oriented oppositely in the X direction as shown in FIG. 5A. Moreover, the acting point of the force $F_{PH}$ the holder member 12X receives from the belt 13 (i.e., the end in the negative X direction of the driven pulley 11) is displaced in the Y direction from the acting point of the force $F_{SP}$ the holder member 12X receives from the biasing member 14 (i.e., the end in the positive X direction of the operating part 124X). As a result, a rotational force $M_{PH}$ acts on the holder member 12X counterclockwise as viewed from the positive Z direction.

The counterclockwise rotational force $M_{PH}$ applied to the holder member 12X while the claw part 123X is positioned completely within the enlarged opening portion 711X may cause the claw part 123X to move out of the enlarged opening portion 711X in the positive Y direction as shown in FIG. 5B, potentially resulting in detachment of the holder member from the frame 7X. This means that, in the configuration of the comparative example, there is a possibility that the holder member 12X may detach from the frame 7X due to a counterclockwise rotational force $M_{PH}$ applied to the holder member 12X when the holder member 12X reaches the predetermined location closer to the drive pulley 10 (in the positive X direction).

To prevent detachment of the holder member 12X, it is necessary to prevent the holder member 12X from reaching the predetermined location closer to the drive pulley 10. One approach to achieving this is to ensure that the force $F_{SP}$ applied by the biasing member 14 to the holder member 12X is sufficiently large relative to the potential force $F_{CR}$ required for the carriage 5 to be driven. However, this approach leads to several drawbacks, such as an increased load on the drive member 9, which requires a larger motor, increased cost, higher power consumption, and larger housing, among others. Another alternative is to restrict the movement of the holder member 12X towards the drive pulley 10 (in the positive X direction) using a fastening member such as a screw, after attaching the holder member

12X to the frame 7X. However, this approach results in an increase in the number of components and the number of assembling steps required.

Embodiment 1

Figure 6A:
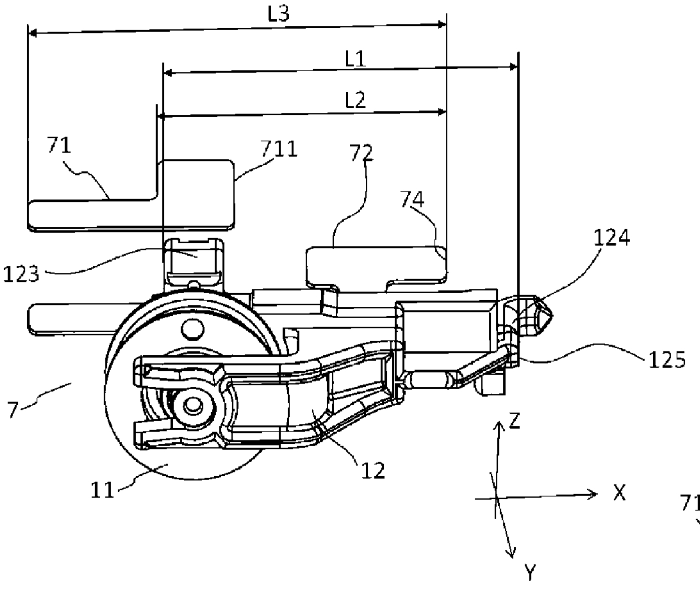
FIG. 6A to FIG. 6F are diagrams illustrating the configuration of the holder member according to Embodiment 1.
Figure 6D:
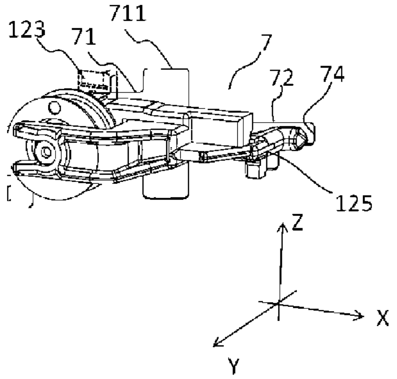
Figure 6E:
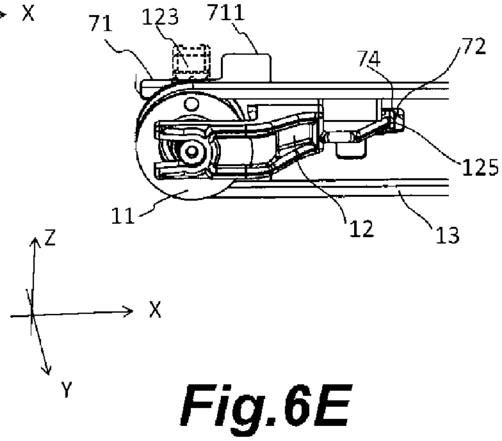
Figure 6B:
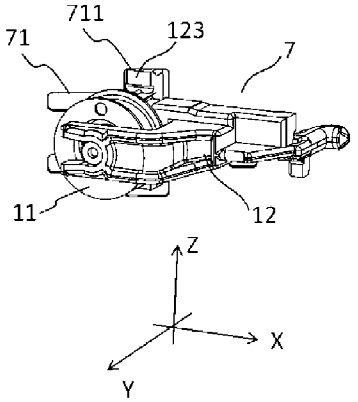
Figure 6C:
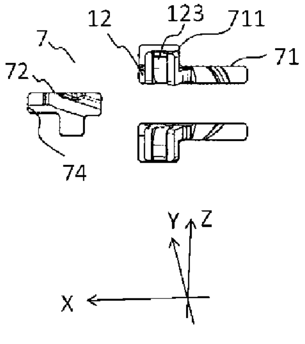
Figure 6F:
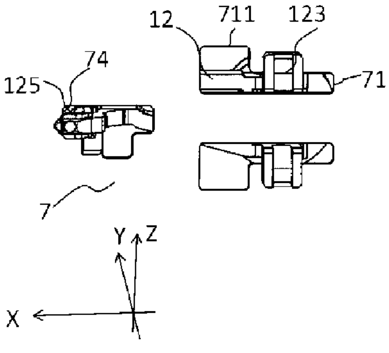
Figure 7:
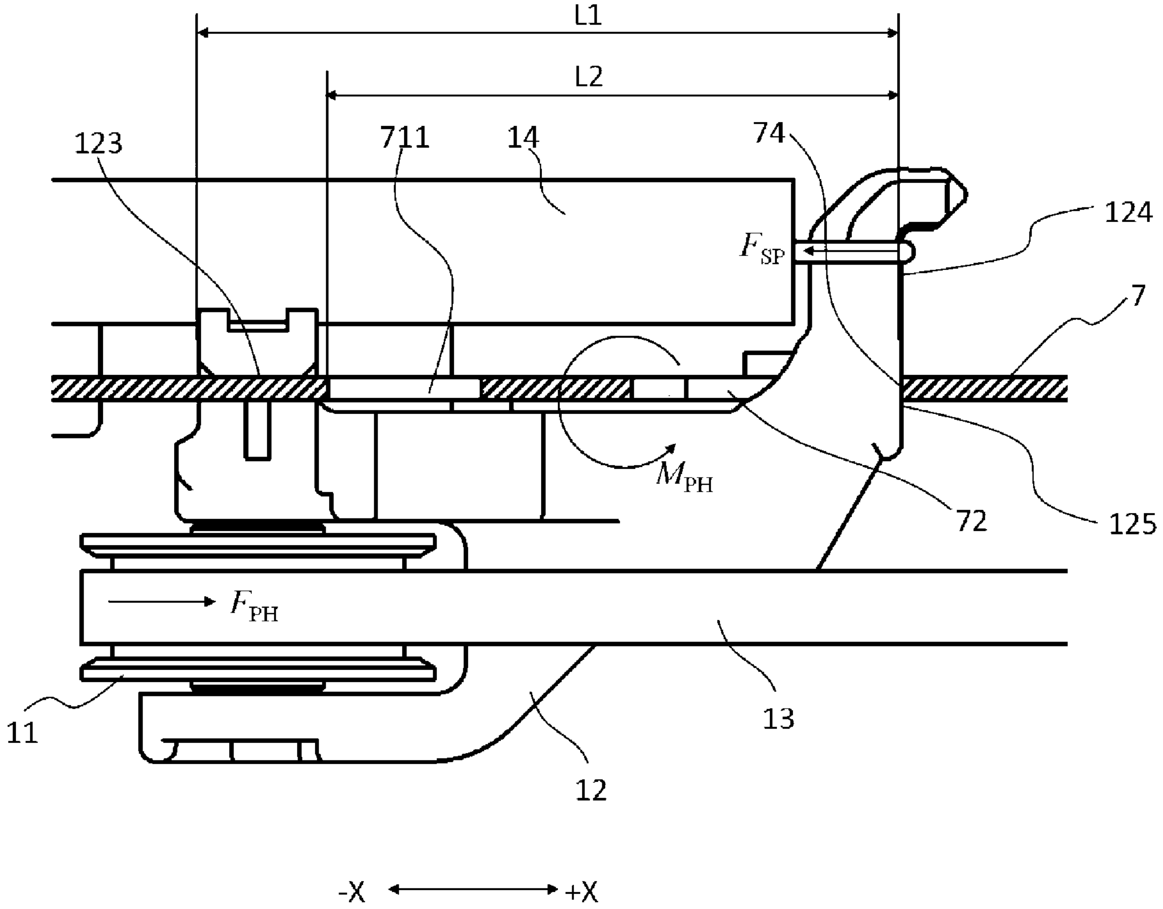
FIG. 7 is a diagram explaining the behavior of the holder member according to Embodiment 1 when the holder member is positioned in a predetermined location closer to a drive pulley.

FIG. 6A to FIG. 6F and FIG. 7 are diagrams illustrating the configuration of the holder member 12 according to Embodiment 1. FIG. 6A to FIG. 6F are diagrams illustrating an assembling process of the holder member 12 according to Embodiment 1. FIG. 6A, FIG. 6B, FIG. 6D, and FIG. 6E are diagrams of the holder member 12 as viewed from the front side, and FIG. 6C and FIG. 6F are diagrams of the holder member 12 as viewed from the back side. FIG. 7 is a diagram explaining the behavior of the holder member 12 according to Embodiment 1 when the holder member 12 is positioned in a predetermined location closer to the drive pulley 10.

L1 denotes the distance along the direction of relative movement (i.e., the X direction) between the end (i.e., the end in the negative X direction) of the claw part 123 farthest away from the drive pulley 10 and the end (i.e., the end in the positive X direction) 125 (constituting a restricted part to be described later) of the operating part 124 penetrating the second opening 72 and closest to the drive pulley 10. L2 denotes the distance along the direction of relative movement (i.e., the X direction) between the end (i.e., the end in the negative X direction) of the enlarged opening portion 711 of the frame 7 farthest away from the drive pulley 10 and the end (i.e., the end in the positive X direction) 74 (constituting a restricting part to be described later) of the second opening 72 closest to the drive pulley 10. In Embodiment 1, L1>L2. L3 denotes the distance along the direction of relative movement (i.e., the X direction) between the end (i.e., the end in the negative X direction) of the first opening 71 of the frame 7 farthest away from the drive pulley 10 and the end (i.e., the end in the positive X direction) 74 (constituting a restricting part to be described later) of the second opening 72 closest to the drive pulley 10. In Embodiment 1, L3>L1.

When attaching the holder member 12 to the frame 7, the claw part 123 is first passed through the enlarged opening portion 711, with the back side of the holder member 12 being inclined relative to the front side of the frame 7 as the holder member 12 is brought closer to the frame 7, as shown in FIG. 6B and FIG. 6C. The holder member 12 is then moved (in the negative X direction) away from the drive pulley 10 so that the claw part 123 engages with the frame 7 via the first opening 71 as shown in FIG. 6D. The holder member 12 is moved farther (in the negative X direction) away from the drive pulley 10 so that the entire operating part 124 is aligned with the position of the second opening 72 in the X direction. After that, the holder member 12 is rotated counterclockwise as viewed from the positive Z direction so that the operating part 124 penetrates the second opening 72, as shown in FIG. 6E and FIG. 6F. In this state, the biasing member 14 is connected to the operating part 124, and the belt 13 is passed around the drive pulley 10 and driven pulley 11. The holder member 12 is thus attached to the frame 7.

The movement of the holder member 12 (in the positive X direction) towards the drive pulley 10 is restricted by the end (i.e., the end in the positive X direction) 125 of the operating part 124 penetrating the second opening 72 and closest to the drive pulley 10 making contact with the end 74 of the second opening 72 closest to the drive pulley 10. The end 74 of the second opening 72 closest to the drive pulley 10 thus serves as a restricting part that restricts the movement of the holder member 12 towards the drive pulley 10 by making contact with the holder member 12. Therefore, hereinafter the end 74 shall also be referred to as the restricting part 74. The end 125 of the operating part 124 penetrating the second opening 72 and closest to the drive pulley 10 serves as a restricted part capable of making contact with the restricting part. Therefore, hereinafter the end 125 shall also be referred to as the restricted part 125. In Embodiment 1, the restricting part 74 is a portion of the second opening 72.

When the restricting part 74 of the frame 7 makes contact with the restricted part 125 of the holder member 12, the holder member 12 is positioned in a predetermined location closer to the drive pulley 10 (in the positive X direction). That is, the holder member 12 is able to move (in the positive X direction) towards the drive pulley 10 until the restricting part 74 of the frame 7 makes contact with the restricted part 125 of the holder member 12. Namely, the predetermined location is the movement limit of the holder member 12 on the side closer to the drive pulley 10. The holder member 12 moves in the X direction as far as to a position where the force $F_{PH}$ provided by the tension of the belt 13 balances the force $F_{SP}$ received from the biasing member 14.

Let us now assume that, in Embodiment 1, the force $F_{CR}$ required for the drive of the carriage 5 has increased and the holder member 12 has reached the predetermined location closer to the drive pulley 10 (in the positive X direction). At this position, the restricted part 125 makes contact with the restricting part 74. However, since L1>L2, at least a portion of the claw part 123 is positioned within a part of the first opening 71 that is not the enlarged opening portion 711. In other words, the end (i.e., the end in the negative X direction) of the claw part 123 farthest away from the drive pulley 10 is located farther from the drive pulley 10 than the end (i.e., the end in the negative X direction) of the enlarged opening portion 711 farthest away from the drive pulley 10. In Embodiment 1, the claw part 123 is entirely positioned in a part that is not the enlarged opening portion 711 as shown in FIG. 7. Therefore, according to Embodiment 1, the claw part 123 is unlikely to disengage from the frame 7 even when the holder member 12 reaches the predetermined location closer to the drive pulley 10 (in the positive X direction).

The force $F_{PH}$ the holder member 12 receives from the belt 13 and the force $F_{SP}$ the holder member 12 receives from the biasing member 14 are oriented oppositely in the X direction. Moreover, the acting point of the force $F_{PH}$ the holder member 12 receives from the belt 13 (i.e., the end in the negative X direction of the driven pulley 11) is displaced in the Y direction from the acting point of the force F s p the holder member 12 receives from the biasing member 14 (i.e., the end in the positive X direction of the operating part 124). As a result, a rotational force $M_{PH}$ acts on the holder member 12 counterclockwise as viewed from the positive Z direction.

In the case of Embodiment 1, the claw part 123 is unlikely to disengage from the frame 7 when the holder member 12 reaches the predetermined location closer to the drive pulley 10 (in the positive X direction), so that the claw part 123 does not pass through the enlarged opening portion 711 even when the counterclockwise rotational force $M_{PH}$ is applied to the holder member 12. Thus detachment of the holder member 12 from the frame 7 is prevented.

According to Embodiment 1, as described with reference to FIG. 6D and FIG. 6E, the holder member 12 is rotated counterclockwise as viewed from the positive Z direction when attaching the holder member 12 to the frame 7. In other words, the holder member 12 needs to be rotated clockwise as viewed from the positive Z direction when removing the holder member 12 from the frame 7. As mentioned above, the rotational force $M_{PH}$ that acts on the holder member 12 due to the tension of the belt 13 and the biasing force of the biasing member 14 is counterclockwise as viewed from the positive Z direction. Therefore, the rotational force $M_{PH}$ that acts on the holder member 12 due to the tension of the belt 13 and the biasing force of the biasing member 14 does not cause the holder member 12 to detach from the frame 7. According to Embodiment 1, detachment of the holder member 12 from the frame 7 is prevented by this feature, too.

Embodiment 2

In Embodiment 1, the belt 13 passes around the drive pulley 10 and driven pulley 11, and the holder member 12 moves parallel to the direction of carriage 5 (recording head 6) movement (both in the X direction) relative to the drive pulley 10 (frame 7). The pulley configuration is not limited to this example described above. The holder member 12 may be designed to move in a direction that intersects with the direction of carriage 5 (recording head 6) movement relative to the drive pulley 10.

Figure 8:
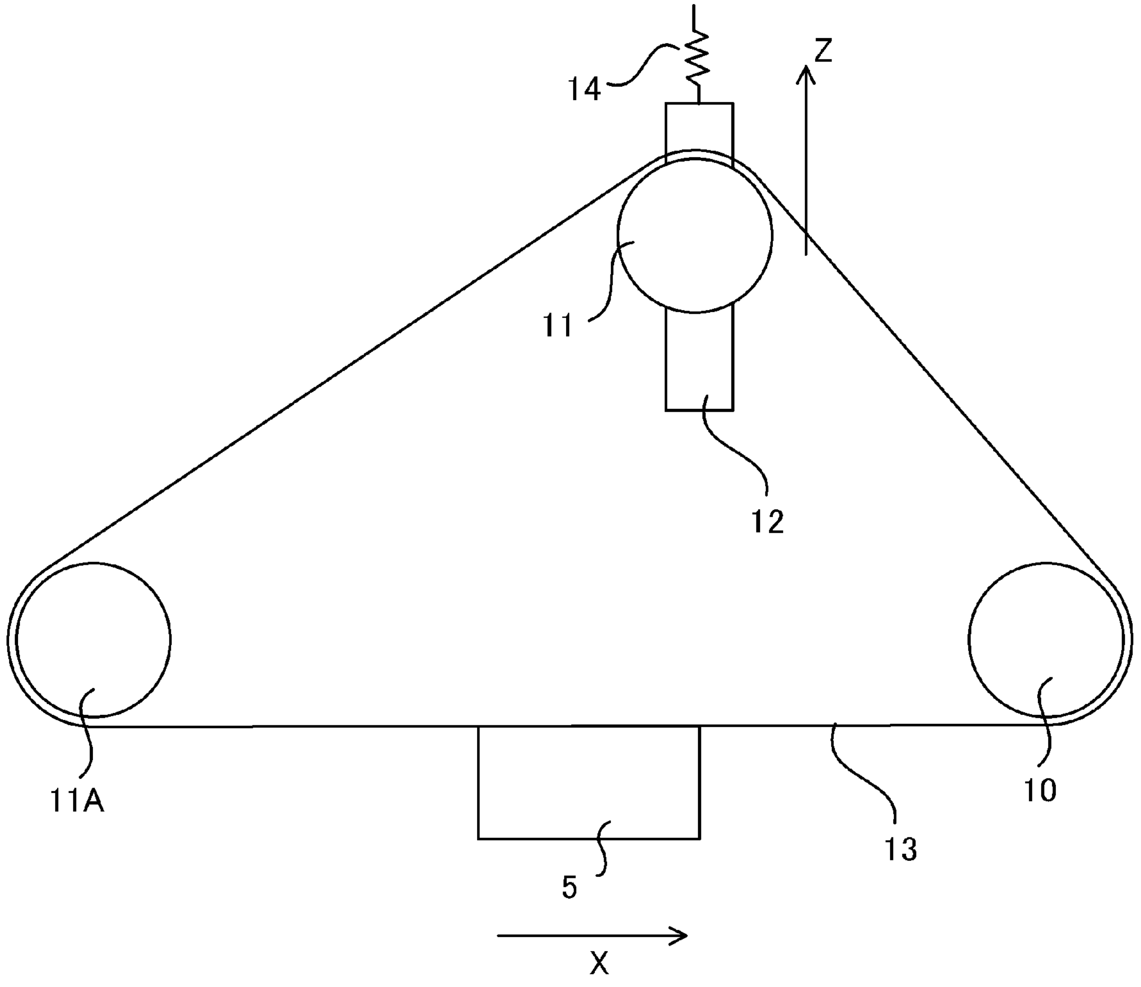
FIG. 8 is a diagram explaining the pulley configuration and the direction of relative movement of the holder member according to Embodiment 2.

FIG. 8 is a diagram depicting Embodiment 2, which features a different pulley configuration and direction of movement of the holder member relative to the drive pulley compared to Embodiment 1. FIG. 8 is a schematic diagram illustrating the configuration of the drive pulley, driven pulley, and belt in an image recording apparatus of Embodiment 2. The same reference numerals and names will be used for the components common to Embodiment 1 and a detailed description thereof will be omitted.

Embodiment 2 further includes at least one fixed driven pulley 11A that remains stationary and does not move relative to the drive pulley 10 (frame 7). The belt 13 passes around the drive pulley 10, driven pulley 11, and fixed driven pulley 11A in this configuration. The holder member 12 that holds the driven pulley 11 such as to be movable relative to the drive pulley 10 moves in a direction that intersects with the direction of movement of the carriage 5 (recording head 6). Embodiment 2 provides one example in which the carriage 5 moves in the X direction, while the holder member 12 moves in the Z direction relative to the drive pulley, as shown in FIG. 8. Namely, the holder member moves towards the drive pulley 10 in the negative Z direction, and away from the drive pulley 10 in the positive Z direction. The biasing member 14 applies a force to cause the holder member 12 to move (in the positive Z direction) away from the drive pulley 10, which generates tension in the belt 13.

Embodiment 2 also features the same relationship between the restricting part 74 of the frame 7 and the restricted part 125 of the holder member 12 as Embodiment 1, despite the different pulley configuration and direction of movement of the holder member relative to the drive pulley. Namely, when the holder member 12 is positioned in a predetermined location closer to the drive pulley 10 (in the negative Z direction), at least a portion of the claw part 123 is positioned within a part of the first opening 71 that is not the enlarged opening portion 711. This prevents detachment of the holder member 12 from the frame 7 even when the holder member 12 moves (in the negative Z direction) towards the drive pulley 10 to the predetermined location.

Embodiment 3

The previously described Embodiment 1 provided one example in which the end (i.e., the end in the positive X direction) of the second opening 72 closest to the drive pulley 10 is the restricting part 74, while the end (i.e., the end in the positive X direction) of the operating part 124 penetrating the frame 7 and closest to the drive pulley 10 is the restricted part 125. The configuration of the restricting part and restricted part is not limited to the example described above. The claw part 123, operating part 124, or a different portion of the holder member 12 may be designed as the restricted part, and the first opening 71, second opening 72, or a different portion of the frame 7 may be designed as the restricting part.

Figure 9A:
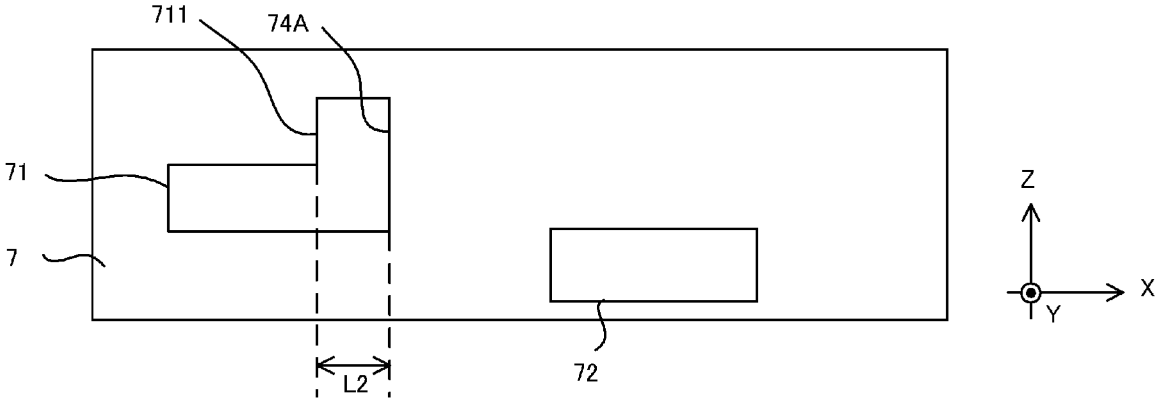
FIG. 9A and FIG. 9B are diagrams illustrating the configuration of the frame and holder member according to Embodiment 3.
Figure 9B:
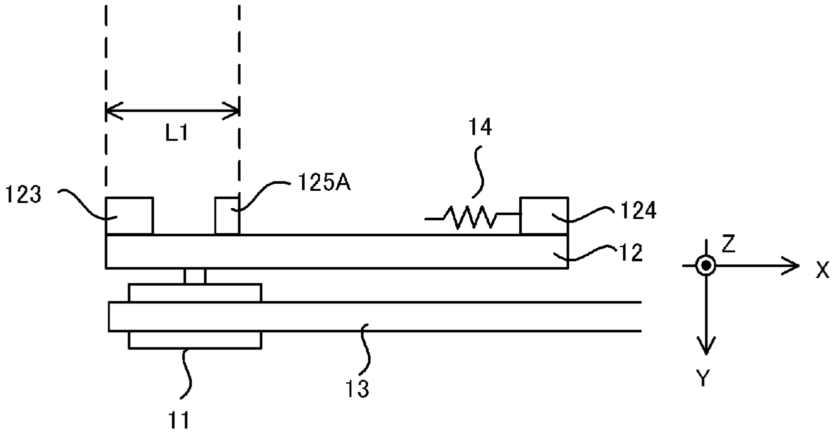

FIG. 9A and FIG. 9B are diagrams depicting Embodiment 3, which features a different configuration of the restricting part and restricted part compared to Embodiment 1. FIG. 9A is a diagram of a part of the frame 7 as viewed from the front side (from the positive Y direction), and FIG. 9B is a diagram of the holder member 12 as viewed from the positive Z direction.

In Embodiment 3, the end (i.e., the end in the positive X direction) of the enlarged opening portion 711 of the first opening 71 of the frame 7 closest to the drive pulley 10 constitutes the restricting part 74A, while a restricted part 125A is provided to the holder member 12 to make contact with the restricting part 74A. In this configuration, L1 denotes the distance along the direction of relative movement (i.e., the X direction) between the end (i.e., the end in the negative X direction) of the claw part 123 of the holder member 12 farthest away from the drive pulley 10 and the restricted part 125A. L2 denotes the distance along the direction of relative movement (i.e., the X direction) between the end (i.e., the end in the negative X direction) of the enlarged opening portion 711 of the frame 7 farthest away from the drive pulley 10 and the restricting part 74A. In this configuration, L1>L2. In Embodiment 3, the restricting part 74A is a portion of the first opening 71.

FIG. 9A and FIG. 9B illustrate a state of the holder member 12 positioned in the predetermined location closer to the drive pulley 10 (in the positive X direction) where the restricting part 74A of the frame 7 makes contact with the restricted part 125A of the holder member 12. In this state, since L1>L2, at least a portion of the claw part 123 is positioned within a part of the first opening 71 that is not the enlarged opening portion 711, as shown in FIG. 9A and FIG. 9B. Therefore, in the configuration of FIG. 9A and FIG. 9B, the claw part 123 is unlikely to disengage from the frame 7 even when the holder member 12 reaches the predetermined location closer to the drive pulley 10 (in the positive X direction).

The present invention, as illustratively described in some embodiments above, prevents detachment of a holder member that holds a driven pulley from a frame in an image recording apparatus where a recording head is driven by a belt and where the holder member is attached to the frame such as to be movable relative to a drive pulley.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102964, filed on Jun. 27, 2022, which is hereby incorporated by reference herein in its entirety.

What is claimed is:

1. An image recording apparatus comprising:

a belt passed around a drive pulley and a driven pulley;

a support member configured to support a recording head and fixed to the belt;

a holder member, having a claw part and an operating part, configured to hold the driven pulley;

a frame having a first opening through which the claw part is capable of penetrating from a front side to a back side of the frame and a second opening through which the operating part is capable of penetrating from the front side to the back side of the frame, and to which the holder member is attached such as to be movable relative to the drive pulley; and a biasing member that applies a force to the operating part on the back side of the frame in a direction away from the drive pulley, wherein the first opening having an enlarged opening portion allowing the claw part to pass through without engaging with the frame on one side closer to the drive pulley, and wherein, in a state where movement of the holder member toward the drive pulley is restricted by the frame, at least a portion of the claw part is engaged with the frame and is positioned within a part of the first opening excluding the enlarged opening portion.

2. The image recording apparatus according to claim 1, wherein, in a state where the movement of the holder member toward the drive pulley is restricted by the frame, one end of the claw part farthest away from the drive pulley is positioned farther from the drive pulley than one end of the enlarged opening portion located farthest away from the drive pulley.

3. The image recording apparatus according to claim 1, wherein the frame includes a restricting part that restricts the movement of the holder member towards the drive pulley by making contact with the holder member, the holder member includes a restricted part capable of making contact with the restricting part, the holder member is configured so that the movement thereof toward the drive pulley is restricted in a state where the restricting part of the frame makes contact with the restricted part of the holder member, the frame and the holder member satisfy a relationship of L1>L2, where L1 denotes a distance between one end of the claw part farthest away from the drive pulley and the restricted part along a direction of movement of the holder member relative to the drive pulley, and L2 denotes a distance between one end of the enlarged opening portion farthest away from the drive pulley and the restricting part along the direction of movement of the holder member relative to the drive pulley.

4. The image recording apparatus according to claim 3, wherein the frame and the holder member satisfy a relationship of L3>L1, where L3 denotes a distance between one end of the first opening farthest away from the drive pulley and the restricting part along the direction of movement of the holder member relative to the drive pulley.

5. The image recording apparatus according to claim 1, wherein the second opening is positioned closer to the drive pulley than the first opening.

6. The image recording apparatus according to claim 3, wherein the restricting part is a portion of the first opening.

7. The image recording apparatus according to claim 3, wherein the restricting part is a portion of the second opening.

8. The image recording apparatus according to claim 1, further comprising at least one fixed driven pulley that remains stationary relative to the drive pulley, wherein the belt is also passed around the fixed driven pulley.

9. The image recording apparatus according to claim 1, wherein the holder member moves relative to the drive pulley in parallel to a moving direction of the support member.

10. The image recording apparatus according to claim 8, wherein the holder member moves relative to the drive pulley in a direction intersecting with a moving direction of the support member.

* * * * *